(12) United States Patent
Rothrock

(10) Patent No.: US 7,006,111 B1
(45) Date of Patent: *Feb. 28, 2006

(54) DIGITAL IMAGE STITCHING

(75) Inventor: Lewis V. Rothrock, Beaverton, OR (US)

(73) Assignee: Intel Corporation, Santa Clara, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/435,940

(22) Filed: Nov. 9, 1999

(51) Int. Cl.
G09G 5/00 (2006.01)

(52) U.S. Cl. .................... 345/629; 345/419; 345/428; 345/582; 345/427

(58) Field of Classification Search ............... 345/419, 345/430, 435, 424, 425, 427, 428, 582, 629, 345/473, 488
See application file for complete search history.

(56) References Cited

U.S. PATENT DOCUMENTS

| | | | |
|---|---|---|---|
| 4,622,632 A * | 11/1986 | Tanimoto et al. ............. 712/11 |
| 5,140,314 A * | 8/1992 | Stansfield et al. .......... 345/629 |
| 5,448,372 A | 9/1995 | Axman et al. |
| 5,532,845 A | 7/1996 | Gusmano |
| 5,706,416 A * | 1/1998 | Mann et al. ................ 345/427 |
| 5,752,113 A | 5/1998 | Borden |
| 5,754,697 A | 5/1998 | Fu et al. |
| 5,809,182 A | 9/1998 | Ward et al. |
| 5,991,461 A * | 11/1999 | Schmucker et al. ........ 382/284 |
| 6,011,558 A * | 1/2000 | Hsieh et al. ................ 345/629 |
| 6,075,905 A * | 6/2000 | Herman et al. ............. 382/284 |
| 6,157,385 A * | 12/2000 | Oxaal ......................... 345/427 |
| 6,178,392 B1 | 1/2001 | Mack et al. |
| 6,434,265 B1 * | 8/2002 | Xiong et al. ................ 382/154 |

OTHER PUBLICATIONS

Comer, Mary L., et al., "Multiresolution Image Segmentation," Proceedings of the 1995 IEEE International Conference on Acoustics, Speech, Detroit, Michigan, pp. 2415-2418 (May 9-12, 1995).

Eichel, Paul, et al., "Sequential Edge Detection in Correlated Random Fields," Proceedings of the IEEE Computer Vision and Pattern Recognition Conference, San Francisco, California, pp. 14-21 (Jun. 1985).

Mallat, Stephane, et al., "Characterization of Signals from Multiscale Edges," IEEE Transactions on Pattern Analysis and Machine Intelligence, vol. 14, No. 7, pp. 710-732 (Jul. 1992).

Rosenfeld, Azriel, et al., "Edge and Curve Detection for Visual Scene Analysis," IEEE Transactions on Computers, vol. C-20, No. 5, pp. 562-569 (May 1971).

Wilson, R., et al., "Kernel Designs for Efficient Multiresolution Edge Detection and Orientation Estimation," IEEE Transactions on Pattern Analysis and Machine Intelligence, vol. 14, No. 3, pp. 384-390 (Mar. 1992).

Eastman Kodak Company, "FlashPix Executive Summary," 3 pages (accessed over the Internet at www.kodak.com on Feb. 12, 1999).

(Continued)

Primary Examiner—Kimbinh T. Nguyen
(74) Attorney, Agent, or Firm—Blakely, Sokoloff, Taylor & Zafman LLP

(57) ABSTRACT

Where at least two digital images overlap at a first resolution level is identified. Overlapping areas of the at least two digital images at a second resolution level higher than the first resolution level are obtained. Where the overlapping areas overlap at the second resolution level is identified.

31 Claims, 3 Drawing Sheets

OTHER PUBLICATIONS

Live Picture, Inc. product information for PhotoVista™, 3 pages (accessed over the Internet at www.livepicture.com on Sep. 28, 1999).

PictureWorks Technology, Inc., "Spin™ By PictureWorks Turning the Imaging Industry Around", 3 pages (Mar. 31, 1997).

PictureWorks Technology, Inc., product information for Spin PhotoObject and Spin Panorama, 15 pages (accessed over the Internet at www.pictureworks.com on Oct. 19, 1999).

Cook, Gregory W., et al., "Multiresolution Sequential Edge Linking," Proceedings of the IEEE International Conference on Image Processing, Washington, D.C., pp. 41-44 (Oct. 23-26, 1995.

Teodosio, Laura, et al., "Salient Video Stills: Content and Context Preserved," Proceedings of the ACM Multimedia Conference, Anaheim, California, 8 pages (Aug. 1993).

Eastman Kodak Company, "FPX Executive Summary," 4 pages (accessed over the Internet at www.kodak.com on Sep. 28, 1999).

Eastman Kodak Company, "FPX File Size and Capabilities," 2 pages (accessed over the Internet at www.kodak.com on Sep. 28, 1999).

Enroute product information for QuickStitch™ and QuickStitch™ 360, 5 pages (accessed over the Internet at www.enroute.com on Sep. 28, 1999).

Microsoft Corporation product information for Picture It!, 18 pages (accessed over the Internet at www.microsoft.com on Oct. 19, 1999).

* cited by examiner

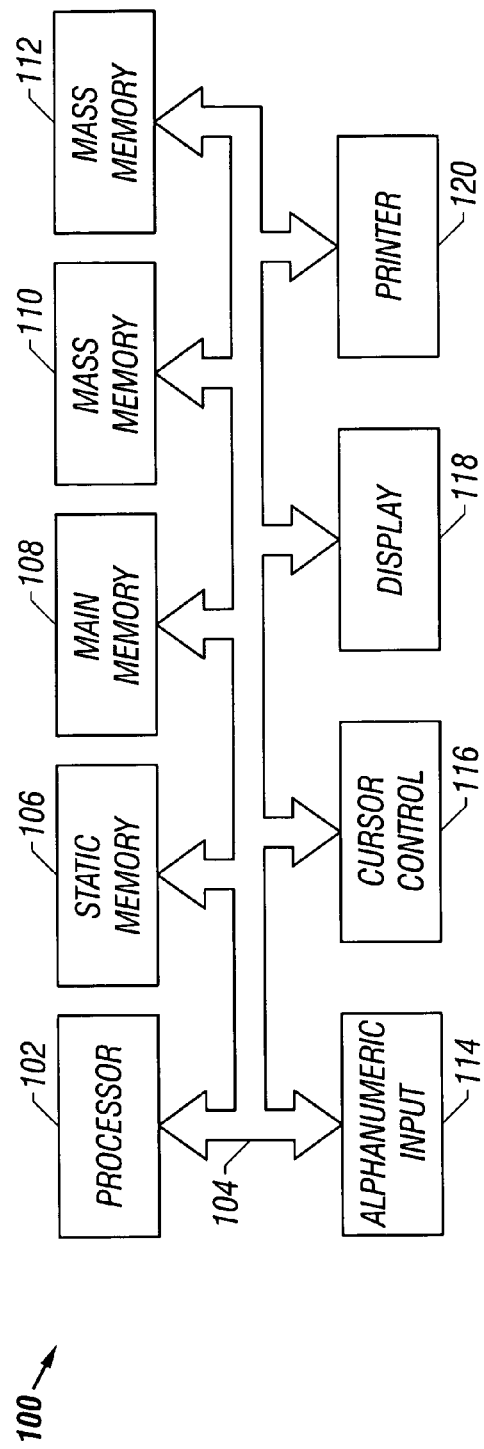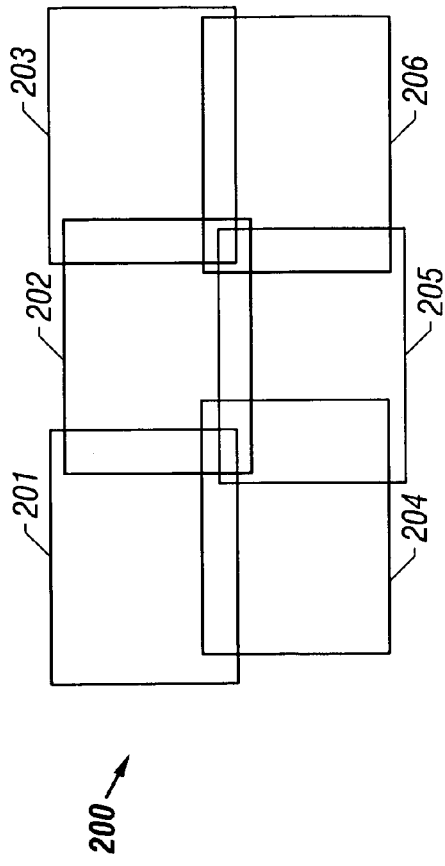

DIGITAL IMAGE STITCHING

BACKGROUND OF THE INVENTION

1. Field of the Invention

The present invention relates generally to the field of digital image processing. More particularly, the present invention relates to the field of digital image stitching.

2. Description of Related Art

A large or panoramic image that otherwise may not be captured as a single image with a camera may be captured by capturing two or more overlapping images and digitally combining or stitching them together to build the larger image.

As one example, a camera may be placed on a tripod and rotated to capture sequential images with a suitable amount of overlap, such as approximately 15% to approximately 30% for example, between the images. The images may be digitally captured or otherwise scanned or converted into a digital format. Known personal computer digital image formats include a bitmap format commonly identified with a BMP file name extension, a joint photographic experts group (JPEG) format commonly identified with a JPG file name extension, a tagged image file format (TIFF) commonly identified with a TIF file name extension, a FlashPix format commonly identified with a FPX file name extension, and a graphics interchange format (GIF) commonly identified with a GIF file name extension.

For one typical stitching technique, a user positions the digital images as thumbnails of the larger image to be built. Alternatively, the order of the sequence of images is identified. In either case, two overlapping images are initially loaded into memory and stitched together to form a single, larger image. Stitching images may be performed using a suitable edge detection technique to identify where each image overlaps and appropriately merging the non-overlapping portions of the images. An image that overlaps the current stitched image in memory is then loaded into memory and stitched with the current stitched image in memory to form an even larger, single image. This process is repeated until all images have been stitched to form the desired large image in memory.

This typical stitching technique performs adequately when using a personal computer to stitch just a few images or relatively low resolution images. Stitching many images or relatively high resolution images, however, may require using virtual memory as the amount of memory required to stitch each image with the current stitched image may exceed the amount of available physical memory. As the ability to capture higher resolution images with affordable digital cameras improves, personal computers may perform this typical stitching technique even less adequately as the higher resolution images will require even more memory.

Where each image has three basic channels of colors, one stitching technique stores in memory only one of the three channels to match overlapping pixels, effectively reducing the required amount of memory by two-thirds. The memory requirements for relatively high resolution images, however, may still be expensive.

BRIEF SUMMARY OF THE INVENTION

Where at least two digital images overlap at a first resolution level is identified. Overlapping areas of the at least two digital images at a second resolution level higher than the first resolution level are obtained. Where the overlapping areas overlap at the second resolution level is identified.

BRIEF DESCRIPTION OF THE DRAWINGS

The present invention is illustrated by way of example and not limitation in the figures of the accompanying drawings, in which like references indicate similar elements and in which:

FIG. 1 illustrates an exemplary computer system for performing digital image stitching in accordance with the present invention;

FIG. 2 illustrates an exemplary large digital image formed by stitching smaller, overlapping digital images;

DETAILED DESCRIPTION

Figure 3:
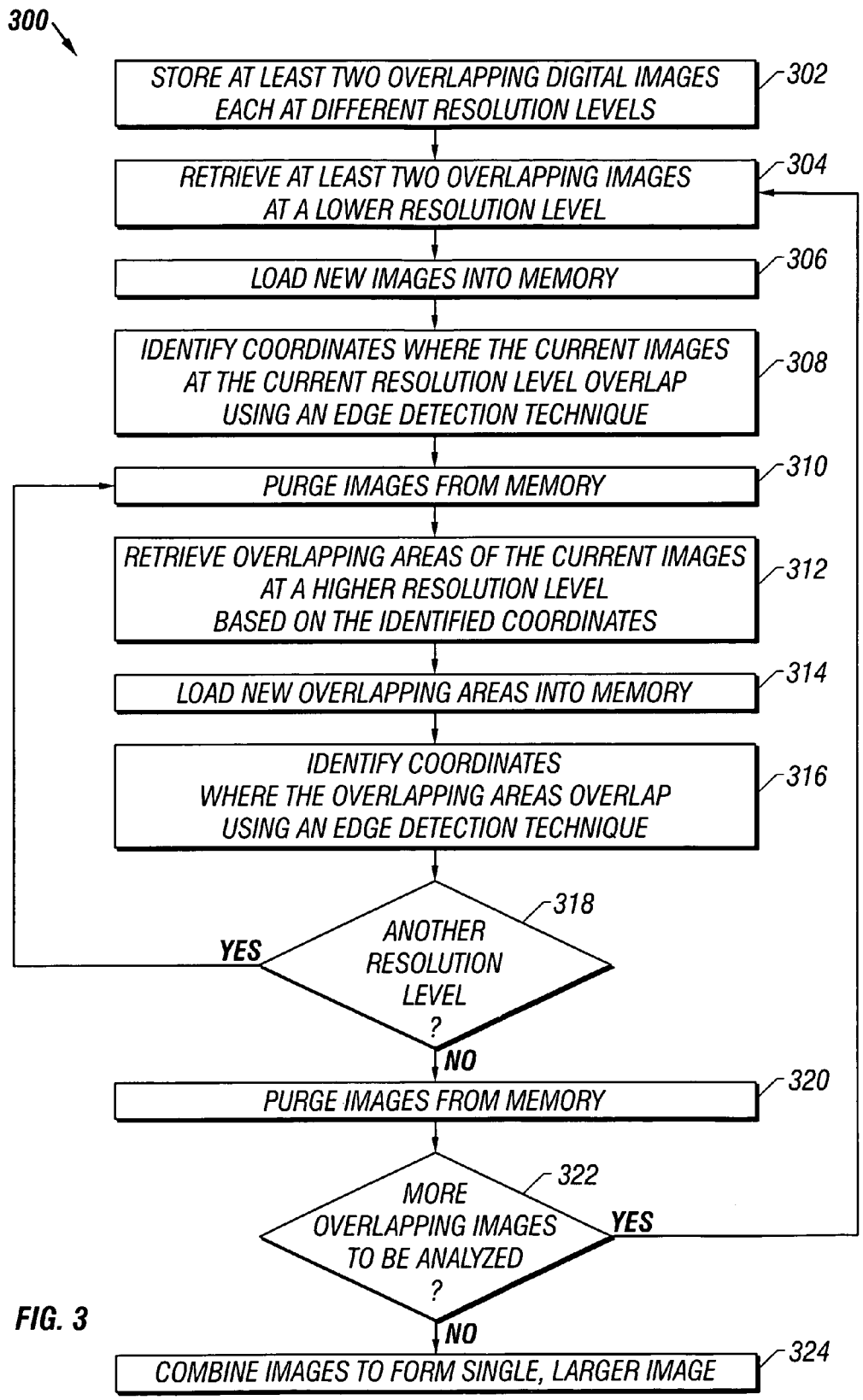
FIG. 3 illustrates, for one embodiment, a flow diagram for performing digital image stitching in accordance with the present invention.

The following detailed description sets forth an embodiment or embodiments in accordance with the present invention for digital image stitching. In the following description, details are set forth such as specific image resolutions, file formats, techniques, etc., in order to provide a thorough understanding of the present invention. It will be evident, however, that the present invention may be practiced without these details. In other instances, well-known techniques, etc., have not been described in particular detail so as not to obscure the present invention.

Computer System

FIG. 1 illustrates, for one embodiment, a computer system 100 that may be programmed to perform digital image stitching in accordance with the present invention.

Computer system 100 comprises a processor 102, a bus 104, a static memory 106, a main memory 108, mass memories 110 and 112, an alphanumeric input device 114, a cursor control device 116, a display 118, and a printer 120. Bus 104 couples processor 102, static memory 106, main memory 108, mass memories 110 and 112, alphanumeric input device 114, cursor control device 116, display 118, and printer 120.

Processor 102 comprises a suitable processing device such as a microprocessor, for example. Processor 102 may execute instructions stored in static memory 106, main memory 108, mass memory 110, and/or mass memory 112 for example. Processor 102 may process data stored in static memory 106, main memory 108, mass memory 110 and/or mass memory 112 for example. For another embodiment, computer system 100 may comprise more than one processor coupled to bus 104 for executing instructions and/or processing data, for example.

Static memory 106, main memory 108, and mass memories 110 and 112 each comprise any suitable computer readable medium for storing data and/or instructions, for example. Static memory 106 may comprise read only memory (ROM) or any other suitable memory device. Static memory 106 may store, for example, a boot program for execution by processor 102 to initialize computer system 100. Main memory 108 may comprise random access memory (RAM) or any other suitable memory device for use as a working memory, for example, for processor 102. Mass memories 110 and 112 may each comprise a hard disk device, a floppy disk or diskette device, an optical disk device such as a compact disc (CD) or digital video disc (DVD) device for example, a Bernoulli disk device such as a Jaz or Zip disk device for example, a flash memory device, a file server device, and/or any other suitable memory device. For one embodiment, mass memory 110 comprises a hard disk device and mass memory 112 comprises an optical disk device. For this detailed description, suitable computer readable medium encompasses any suitable medium for storing information, such as data and/or instructions for example, in a form readable by a computer. Suitable computer readable medium encompasses not only a single memory device but also any combination of suitable memory devices.

Bus 104 provides for the communication of digital information between hardware devices for computer system 100. The hardware devices for computer system 100 may or may not be local with respect to one another. Bus 104 may comprise any suitable communication hardware such as a local bus, a system bus, a local area network (LAN), a wide area network (WAN), or the Internet, for example, and may comprise any combination of suitable communication hardware.

Processor 102 may receive over bus 104 information that is input by a user through alphanumeric input device 114 and/or cursor control device 116. Alphanumeric input device 114 may comprise a keyboard, for example, that comprises alphanumeric keys. Alphanumeric input device 114 may comprise other suitable keys, such as function keys for example. Alphanumeric input device 114 may be used to input information or commands, for example, for computer system 100. Cursor control device 116 may comprise a mouse, touch tablet, track-ball, and/or joystick, for example, for controlling the movement of a cursor displayed by display 118 or may comprise suitable touch screen hardware and/or software for use with display 118.

Processor 102 may also output over bus 104 information that is to be displayed on display 118 or printed by printer 120. Display 118 may comprise a cathode ray tube (CRT) or a liquid crystal display (LCD), for example, for displaying information to a user. Processor 102 may use bus 104 to transmit information to and to receive information from other hardware devices, such as mass memories 110 and 112 for example.

Computer system 100 may be a desktop personal computer (PC) system, a laptop or notebook computer system, or any other suitable computer system. Although digital image stitching in accordance with the present invention is described in the context of computer system 100, any suitable computer system configured with any suitable combination of hardware devices may be used.

Digital Image Stitching

Computer system 100 may be programmed to execute suitable program code or machine instructions directing computer system 100 to perform digital image stitching in accordance with the present invention. The executable program code or machine instructions may be stored in main memory 108 and/or mass memory 110 and/or mass memory 112 for execution by processor 102.

In accordance with the present invention, computer system 100 stitches or combines two or more overlapping digital images to form a single, larger digital image. FIG. 2 illustrates an exemplary large digital image 200 formed by stitching smaller, overlapping digital images 201, 202, 203, 204, 205, and 206.

Computer system 100 may stitch digital images that overlap in any suitable manner. Computer system 100, for example, may stitch digital images that overlap in a linear manner to form a larger, panoramic image. Computer system 100 may also stitch digital images that overlap one another in a stacked manner, such as for the example illustrated in FIG. 2.

For one embodiment, each image should overlap each adjacent image by a minimum suitable percentage or amount of overlap to help ensure each image is appropriately stitched with each adjacent, overlapping image. As one example, each image should overlap each adjacent image by at least approximately 10% to approximately 20%.

Computer system 100 for one embodiment performs digital image stitching in accordance with a flow diagram 300 as illustrated in FIG. 3.

Each of at least two overlapping digital images is stored 302 at different resolution levels. The stored images are to be stitched to form a single, larger image. For one embodiment, the overlapping images to be stitched are identified by a user using, for example, alphanumeric input device 114 and/or cursor control device 116. For the example of FIG. 2, each image 201–206 is stored at different resolution levels. Any suitable number of overlapping images that are to be stitched to form a single, larger image may be stored. The overlapping images may be stored in any suitable image format in mass memory 110 and/or mass memory 112, for example.

Each overlapping image may be stored at any suitable resolution levels in accordance with any suitable scheme. For one embodiment, each image is stored at resolution levels of 1, ½, ¼, etc. times the original resolution level of the image, with rounding as necessary. The highest resolution level for each image may therefore be the original resolution of the image, for example. The lowest resolution level for each image may be, for example, the first lower resolution level less than or equal to a predetermined resolution level threshold. The number of resolution levels may therefore depend, for example, on the original resolution of each image to be stitched. As one example, an image having an original resolution level of 255×385 pixels may be stored at four resolution levels: 255×385 pixels, 128×193 pixels, 64×97 pixels, and 32×49 pixels, where 64×64 pixels may be the lower predetermined resolution level threshold with which the lowest resolution level is determined. Four copies of each overlapping image, each at a different resolution level, are therefore stored.

Computer system 100 may generate and store each overlapping image at different resolution levels based on the image at its original resolution level. Alternatively, each overlapping image may be prestored in mass memory 110 and/or mass memory 112, for example, at different resolution levels. For one embodiment, each overlapping image is stored at different resolution levels in the FlashPix format.

Computer system 100 retrieves 304 a set of at least two stored overlapping images at a lower resolution level and stores or loads 306 each retrieved image into memory, such as main memory 108 for example, for analysis. For one embodiment, the position of each overlapping image with respect to each other overlapping image in the single, larger image is identified by a user using, for example, alphanumeric input device 114 and/or cursor control device 116. Computer system 100 may retrieve any suitable number of stored overlapping images at a lower resolution level. For the example of FIG. 2, images 201 and 202, for example, may be retrieved at a lower resolution level for analysis. Each retrieved image may be retrieved at any suitable lower resolution level such as, for example, the lowest or next lowest resolution level at which the image is stored. The lower resolution level at which each image is retrieved may depend, for example, on the number of images retrieved and the amount of available memory.

Computer system 100 identifies 308 where each current retrieved image overlaps another current retrieved image. Computer system 100 for one embodiment identifies coordinates where each current retrieved image overlaps another current retrieved image. Computer system 100 may use any suitable technique, such as a suitable edge detection technique for example, to identify overlapping portions of the current retrieved images. Where the retrieved images are stored in the FlashPix format, for example, computer system 100 may identify, for each current retrieved image, resolution dependent coordinates where the image overlaps another current retrieved image. Computer system 100 may then convert each identified resolution dependent coordinate into a resolution independent coordinate for the image as defined by the FlashPix format.

Computer system 100 purges 310 the current retrieved images from memory, retrieves 312 overlapping areas of the current images at a higher resolution level, and stores or loads 314 the overlapping areas of the current images at the higher resolution level into memory, such as main memory 108 for example. The overlapping areas may be retrieved at any suitable higher resolution level, such as the next higher resolution level for the current images for example. Any suitable overlapping areas of the current images may be retrieved.

Figure 4:
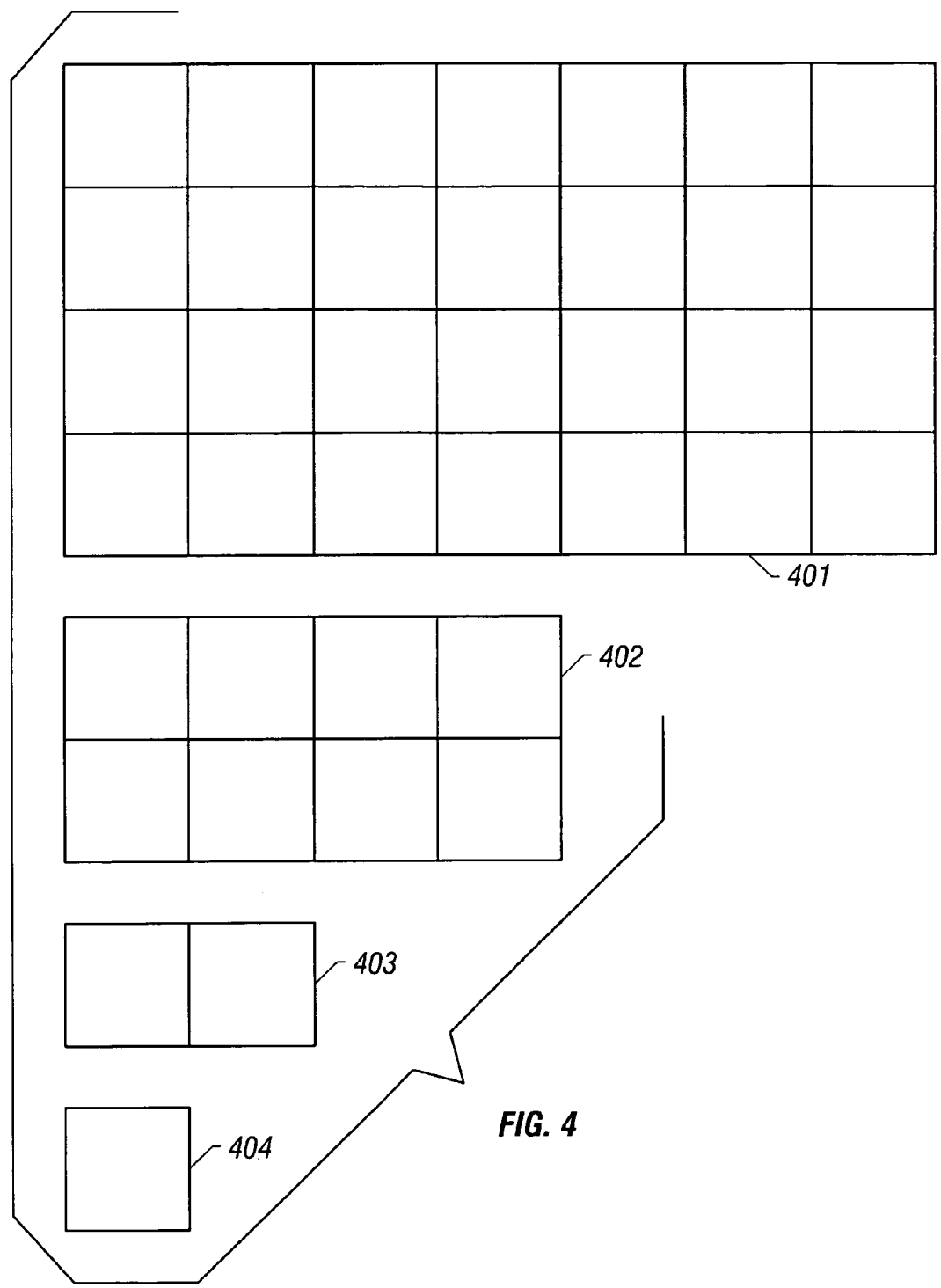
FIG. 4 illustrates an exemplary digital image stored at different resolution levels.

For one embodiment, each stored image is divided into one or more tiles at each resolution level. As one example, as illustrated in FIG. 4, an image having an original resolution level of 255×385 pixels may be stored at four resolution levels: 255×385 pixels at a highest resolution level 401, 128×193 pixels at a next highest resolution level 402, 64×97 pixels at a second lowest resolution level 403, and 32×49 pixels at a lowest resolution level 404. Given a tile threshold size of 64×64 pixels, the image is divided into 4×7 or 28 tiles at resolution level 401, 2×4 or 8 tiles at resolution level 402, 1×2 or 2 tiles at resolution level 403, and 1×1 or 1 tile at resolution level 404.

Computer system 100 then identifies overlapping tiles of the current images at the higher resolution level based on where the current images overlap at the lower resolution level. For one embodiment, computer system 100 identifies in each current image at the higher resolution level one or more tiles having identified coordinates where the current image overlaps another current image at the lower resolution level. Where the retrieved images are stored in the FlashPix format, for example, computer system 100 may use identified resolution independent coordinates where the current image overlaps another current image to identify the overlapping tiles of the current images. Computer system 100 retrieves the identified overlapping tiles of the current images and loads such tiles into memory.

Computer system 100 identifies 316 where each current overlapping area overlaps another current overlapping area. Computer system 100 may identify such overlap similarly as for 308. As the overlapping areas are analyzed at a higher resolution level, computer system 100 identifies with greater accuracy where the current images overlap one another. Where the retrieved images are stored in the FlashPix format, for example, computer system 100 may refine identified resolution independent coordinates where the current image overlaps another current image.

Computer system 100 determines 318 whether the current images are to be analyzed at another higher resolution level. If so, computer system 100 repeats 310–318 for each of one or more higher resolution levels until the current images have been analyzed at a highest desired resolution level. The highest desired resolution level may or may not be the highest available resolution level of the current images. The highest desired resolution level may depend, for example, on the highest available resolution level of the current images, the resolution level at which each current image may be displayed or printed, and/or the resolution level at which the combined, larger image may be displayed or printed.

By analyzing overlapping images at a lower resolution level and then analyzing only areas of overlap of the images at one or more higher resolution levels, computer system 100 may analyze high resolution images with relatively less physical memory, such as main memory 108 for example, and/or with minimized or no need for virtual memory. Entire images may be analyzed to identify overlapping areas at a lower resolution level, requiring less memory as compared to analyzing those same images at a higher resolution level. Only identified overlapping areas are then analyzed at one or more higher resolution levels, requiring less memory as compared to analyzing the entire images at the one or more higher resolution levels as any higher resolution non-overlapping areas are not unnecessarily loaded or stored in memory.

Although described as storing overlapping images at different resolution levels prior to analyzing such images for overlap, computer system 100 for another embodiment may generate overlapping images or image areas at suitable resolution levels while analyzing images for overlap. That is, computer system 100 may generate overlapping images at a lower resolution level as needed for 304 and may identify and generate overlapping areas of current images at a higher resolution level as needed for 312.

When the current images have been analyzed at the highest desired resolution level, as determined for 318, computer system 100 purges 320 overlapping image areas from memory and determines 322 whether any more stored overlapping images are to be analyzed. If so, computer system 100 repeats 304–322 until each stored overlapping image has been analyzed with respect to the other stored overlapping images. For the example of FIG. 2, image 201 is analyzed with respect to images 202, 204, and 205. Image 202 is analyzed with respect to images 201, 203, 204, 205, and 206. Image 203 is analyzed with respect to images 202, 205, and 206. Image 204 is analyzed with respect to images 201, 202, and 205. Image 205 is analyzed with respect to images 201, 202, 203, 204, and 206. Image 206 is analyzed with respect to images 202, 203, and 205. Computer system 100 may analyze any suitable number of images at a time and in any suitable order.

Computer system 100 may maintain and store any suitable information identifying where a stored overlapping image overlaps another stored overlapping image. Computer system 100 may maintain and store, for example, overlapping coordinate information and/or overlapping area information. Computer system 100 may maintain and store such information for any suitable resolution level(s) of a stored overlapping image. Computer system 100 may maintain and store such information, for example, for only the highest desired resolution level or for all resolution levels of a stored overlapping image.

Computer system 100 may maintain and store such information in any suitable manner. For one embodiment, computer system 100 may maintain such information in memory as current images are being analyzed and then store such information in mass memory 110 and/or mass memory 112, for example, when the current images have been analyzed at the highest desired resolution level as determined for 318.

Computer system 100 may store all such information in a single file to identify where the stored overlapping images to be combined to form a single, larger image overlap one another. Computer system 100 may also store such information in separate files each corresponding to a set of two or more stored overlapping images.

Computer system 100 may also store with a stored overlapping image suitable information identifying where the stored overlapping image overlaps one or more other stored overlapping images. Where images are stored in the FlashPix format, for example, computer system 100 may store as a FlashPix extension for a stored overlapping image the resolution independent coordinates where the stored overlapping image overlaps one or more other stored overlapping images. Computer system 100 for one embodiment may store such resolution independent coordinates for the stored overlapping image at each analyzed resolution level.

When all desired stored overlapping images have been analyzed for overlap, as determined for 322, computer system 100 may combine 324 all or a subset of the analyzed stored overlapping images to form a single, larger image. For the example of FIG. 2, computer system 100 may combine all images 201–206 to form image 200. Computer system 100 may form the single, larger image in any suitable image format. For one embodiment, computer system 100 forms the single, larger image in a single file for storage and subsequent retrieval. Computer system 100 may also form the single, larger image for display on display 118 or for printing with printer 120. Computer system 100 may optionally crop or mask any stepped edges of the single, larger image as desired. The stepped edges of image 200, for example, may be cropped to shape image 200 as a rectangle.

Computer system 100 may combine stored overlapping images in any suitable order and in any suitable manner. For one embodiment, computer system 100 may build a single, larger image by adding one stored overlapping image at a time based on the position of the stored overlapping image within the single, larger image and based on stored information identifying how the stored overlapping image overlaps with adjacent images already added in building the single, larger image. Computer system 100 may add each stored overlapping image in building the single, larger image in mass memory 110 and/or mass memory 112, for example.

As information identifying how stored overlapping images overlap is saved, stored overlapping images may be combined in any suitable manner at any suitable time. Where such information is stored for more than one resolution level of stored overlapping images, computer system 100 may combine such images at any desired resolution level to form a single, larger image at the desired resolution level. Computer system 100, for example, may combine such images at a desired one of a number of resolution levels for display on display 118 and/or at a desired one of a number of resolution levels for printing with printer 120.

Although described as combining stored overlapping images for 324 after analyzing the stored overlapping images for 304–322, computer system 100 for another embodiment may combine stored overlapping images while computer system 100 analyzes stored overlapping images.

As one example, computer system 100 may analyze two or more stored overlapping images for overlap and combine them to start building a single, larger image. Computer system 100 may then analyze the partially built single, larger image and one or more stored overlapping images for overlap and combine them to build the single, larger image further. Computer system 100 may continue analyzing and combining stored overlapping images in this manner until the single, larger image is built. For the example of FIG. 2, images 201 and 202 may be analyzed for overlap and combined to start building image 200. Image 203 and the combined image formed from images 201 and 202 may then be analyzed for overlap and combined. Image 204 and the combined image formed from images 201, 202, and 203 may then be analyzed for overlap and combined. Image 205 and the combined image formed from images 201, 202, 203, and 204 may then be analyzed for overlap and combined. Lastly, image 206 and the combined image formed from images 201, 202, 203, 204, and 205 may be analyzed for overlap and combined to form image 200.

As another example, computer system 100 may analyze and combine separate sets of stored overlapping images and then analyze and combine the separate combined sets of images. For the example of FIG. 2, images 201 and 204 may be analyzed for overlap and combined with one another. Images 202 and 205 may be analyzed for overlap and combined with one another. Images 203 and 206 may be analyzed for overlap and combined with one another. Each combined pair of images may then be analyzed for overlap and combined to form image 200.

In the foregoing description, the invention has been described with reference to specific exemplary embodiments thereof. It will, however, be evident that various modifications and changes may be made thereto without departing from the broader spirit or scope of the present invention as defined in the appended claims. The specification and drawings are, accordingly, to be regarded in an illustrative rather than a restrictive sense.

What is claimed is:

1. A method comprising:
   identifying first overlap information regarding where at least two digital images overlap at a first resolution level;
   purging memory, subsequent to said identifying, of the at least two digital images at the first resolution level;
   retrieving, subsequent to said purging, overlapping areas of the at least two digital images at a second resolution level higher than the first resolution level based on the first overlap information; and
   identifying second overlap information regarding where overlapping ones of the retrieved overlapping areas overlap at the second resolution level.

2. The method of claim 1, wherein each of the at least two digital images are stored at the first and second resolution levels.

3. The method of claim 1, wherein the retrieving comprises:
   dividing each of the at least two digital images into a plurality of areas at the second resolution level; and
   storing the plurality of areas at the second resolution level in the memory to identify where the plurality of areas overlap at the second resolution level.

4. The method of claim 1, wherein the identifying where the at least two digital images overlap at the first resolution level and the identifying where overlapping ones of the areas at the second resolution level overlap each comprise using an edge detection technique to identify the first and second overlap information.

5. The method of claim 1, wherein the identifying the first overlap information regarding where the at least two digital images overlap at the first resolution level comprises identifying coordinates where the at least two digital images at the first resolution level; and wherein the retrieving the overlapping areas of the at least two digital images at the second resolution level overlap comprises loading the overlapping areas based on the identified coordinates.

6. The method of claim 1, comprising:
combining the at least two digital images.

7. The method of claim 1, comprising:
identifying where the at least two digital images overlap at one or more resolution levels higher than the second resolution level.

8. The method of claim 1, comprising:
identifying further, first overlap information regarding where another set of at least two digital images overlap at the first resolution level;
retrieving overlapping areas of the other set of at least two digital images at the second resolution level based on the further, first overlap information;
identifying further, second overlap information regarding where overlapping ones of the retrieved overlapping areas overlap at the second resolution level; and
combining the digital images.

9. The method of claim 1, wherein the retrieving further comprises dividing each of the at least two digital images at the second resolution level into a plurality of tiles each having a size less than a threshold size.

10. A computer readable medium having instructions that, when executed by a computer, perform a method comprising:
identifying first overlap information regarding where at least two digital images overlap at a first resolution level;
purging memory, subsequent to said identifying, of the at least two digital images at the first resolution level;
retrieving, subsequent to said purging, overlapping areas of the at least two digital images at a second resolution level higher than the first resolution level based on the first overlap information; and
identifying second overlap information regarding where overlapping ones of the retrieved overlapping areas overlap at the second resolution level.

11. The computer readable medium of claim 10, wherein each of the at least two digital images are stored at the first and second resolution levels.

12. The computer readable medium of claim 10, wherein the retrieving comprises:
dividing the at least two digital images into a plurality of areas at the second resolution level; and
storing the plurality of areas at the second resolution level in memory to identify where the plurality of areas overlap at the second resolution level.

13. The computer readable medium of claim 10, wherein the identifying where the at least two digital images overlap at the first resolution level and the identifying where overlapping ones of the areas at the second resolution level overlap each comprise using an edge detection technique to identify the first and second overlap information.

14. The computer readable medium of claim 10, wherein the identifying first overlap information regarding where the at least two digital images overlap at the first resolution level comprises identifying coordinates where the at least two digital images overlap at the first resolution level; and
wherein the retrieving the overlapping areas of the at least two digital images at the second resolution level comprises loading the overlapping areas based on the identified coordinates.

15. The computer readable medium of claim 10, wherein the method comprises combining the at least two digital images.

16. The computer readable medium of claim 10, wherein the method comprises identifying where the at least two digital images overlap at one or more resolution levels higher than the second resolution level.

17. The computer readable medium of claim 10, wherein the method comprises:
identifying further, first overlap information regarding where another set of at least two digital images overlap at the first resolution level;
retrieving overlapping areas of the other set of at least two digital images at the second resolution level based on the further, first overlap information;
identifying further, second overlap information regarding where overlapping ones of the retrieved overlapping areas of the other set of at least two digital images overlap at the second resolution level; and
combining the digital images.

18. The computer readable medium of claim 10, wherein the retrieving further comprises dividing each of the at least two digital images at the second resolution level into a plurality of tiles each having a size less than a threshold size.

19. A computer system comprising:
(a) one or more processors; and
(b) a computer readable medium to store instructions that, when executed by the one or more processors, perform:
(i) identifying first overlap information regarding where at least two digital images overlap at a first resolution level,
(ii) purging memory, subsequent to said identifying, of the at least two digital images at the first resolution level;
(iii) retrieving, subsequent to said purging, overlapping areas of the at least two digital images at a second resolution level higher than the first resolution level based on the first overlap information, and
(iv) identifying second overlap information regarding where overlapping ones of the retrieved overlapping areas overlap at the second resolution level.

20. The computer system of claim 19, comprising a computer readable medium to store each of the at least two digital images at the first and second resolution levels.

21. The computer system of claim 19, wherein retrieving comprises:
dividing each of the at least two digital images into a plurality of areas at the second resolution level, and
storing the plurality of areas at the second resolution level in memory to identify where the plurality of areas overlap at the second resolution level.

22. The computer system of claim 19, wherein the identifying where the at least two digital images overlap at the first resolution level and the identifying where overlapping ones of the areas at the second resolution level overlap each comprise using an edge detection technique to identify the first and second overlap information.

23. The computer system of claim 19, wherein the identifying where the at least two digital images overlap at the first resolution level comprises identifying coordinates where the at least two digital images at the first resolution level overlap; and
wherein the retrieving the overlapping areas of the at least two digital images at the second resolution level comprises loading the overlapping areas based on the identified coordinates.

24. The computer system of claim 19, the computer readable medium to store instructions that, when executed by the one or more processors, perform combining the at least two digital images.

25. The computer system of claim 19, the computer readable medium to store instructions that, when executed by the one or more processors, perform identifying where the at least two digital images overlap at one or more resolution levels higher than the second resolution level.

26. The computer system of claim 19, the computer readable medium to store instructions that, when executed by the one or more processors, perform:
   identifying further, first overlap information regarding where another set of at least two digital images overlap at the first resolution level,
   purging memory, subsequent to said identifying, of the at least two digital images at the first resolution level;
   retrieving, subsequent to said purging, overlapping areas of at least two digital images at the second resolution level based on the further, first overlap information;
   identifying further, second overlap information regarding where overlapping ones of the retrieved overlapping areas of the other set of at least two digital images overlap at the second resolution level.

27. The computer system of claim 19, wherein the dividing comprises retrieving further each of the at least two digital images at the second resolution level into a plurality of tiles each having a size less than a threshold size.

28. A computer system comprising:
   means for identifying first overlap information regarding where at least two digital images overlap at a first resolution level;
   means for purging memory, subsequent to said identifying, of the at least two digital images at the first resolution level;
   means for retrieving, subsequent to said purging, overlapping areas of the at least two digital images at a second resolution level higher than the first resolution level based on the first overlap information; and
   means for identifying second overlap information regarding where overlapping ones of the retrieved overlapping areas overlap at the second resolution level.

29. The computer system of claim 28, comprising:
   means for dividing the at least two digital images into a plurality of areas at the second resolution level; and
   means for storing the plurality of areas at the second resolution level in the memory to identify where the plurality of areas overlap at the second resolution level.

30. The computer system of claim 28, comprising:
   means for combining the at least two digital images.

31. The computer system of claim 28, wherein the dividing means comprises means for dividing each of the at least two digital images at the second resolution level into a plurality of tiles each having a size less than a threshold size.

* * * * *